United States Patent Office 3,524,351
Patented Aug. 18, 1970

3,524,351
SAMPLE INPUT SYSTEM
John G. Bayly and Cecil Rhodes, Deep River, Ontario, Canada, assignors to Atomic Energy of Canada Limited, Ottawa, Ontario, Canada, a corporation of Canada
Filed June 4, 1968, Ser. No. 734,486
Claims priority, application Canada, June 21, 1968, 993,558
Int. Cl. G01n 1/10
U.S. Cl. 73—421        7 Claims

ABSTRACT OF THE DISCLOSURE

An apparatus for delivering samples of liquid from a plurality of sources sequentially to an analyzing apparatus. Each source is provided with a reservoir for collecting samples over a period of time. When a sample from a particular reservoir is to be analyzed suitable valves close off communication with the source, connect the reservoir through a manifold to the analyzer and simultaneously connect the reservoir to a source of air pressure to drive the sample to the analyzer. A similar system is also provided for supplying a continuous flow of reference liquid to the analyzer.

---

Figure 1:
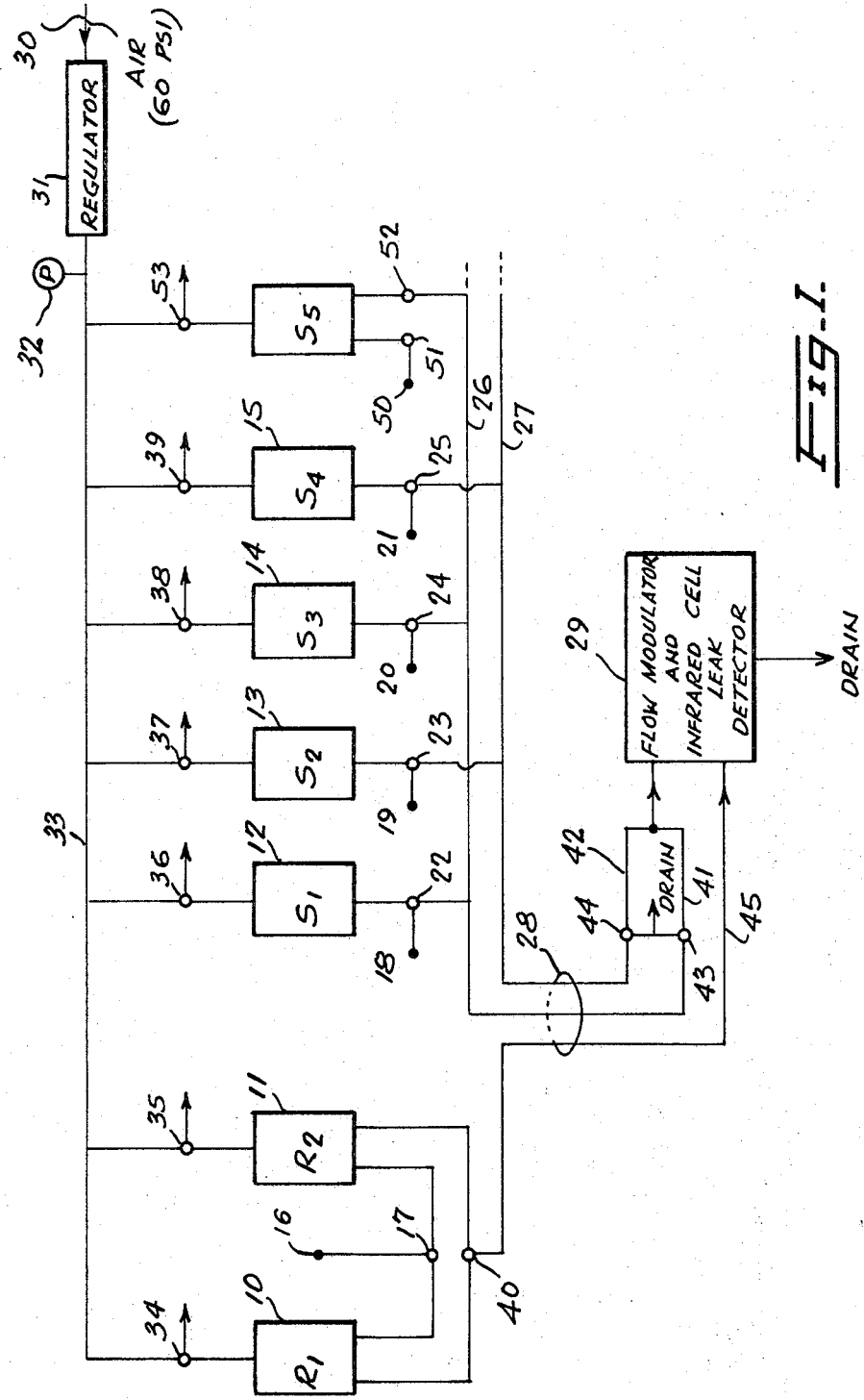

The present invention relates to a system for delivering a plurality of selected samples of a liquid such as water to a comparator for comparing these samples with a reference liquid. In particular the present invention provides a sample delivery system for use with a device for detecting small changes in the isotopic purity of water as disclosed in U.S. Pat. No. 3,411,012.

In apparatus for detecting changes in the isotopic purity of samples of water, the samples being tested are supplied to an infra-red cell alternately with samples of reference water. The infra-red absorption spectra of the sample and the reference are compared and changes in the isotopic purity of the sample are detected by detecting changes in the absorption spectra of the sample in relation to the reference. As disclosed in the above referred patent, the flow through the infra-red cell is modulated by a flow modulator which controls the flow of the reference water and the water samples to be tested.

The apparatus of the present invention provides a system for delivering the required successive samples of water to be tested as well as the reference water to the flow modulator for testing.

It has been determined experimentally that the infra-red absorption spectra of water samples depends critically on both the temperature of the sample and the pressure driving the samples through the system. A sample delivery system to provide satisfactory samples to the infra-red analyser must deliver both the reference water and the samples to the infra-red cell at substantially identical temperatures and pressures.

The cause of the temperature sensitivity is not well understood, but the effect is that an OH absorption band near 4.7 microns weakens and shifts to a longer wavelength as the temperature of the water rises. The OD absorption in HDO at 4 microns also becomes weaker, though with no significant shift. In water near the natural isotopic concentration, a 1° C. rise in temperature gives approximately the same change in the spectrum at 4 microns as a decrease of 110 parts per million nominal $D_2O$ concentration. This effect is in the same direction but about 40 times greater than the effect to be expected from the changes in water density near 30° C. It will thus be appreciated that for the detection of minor changes in isotopic purity it is essential to keep the temperature of the reference water and the sample water constant to within 0.01° C.

In order to drive the water through the infra-red cell, it has been determined that a pressure of approximately 30 to 45 lbs. per square inch is required. An increase of 1 p.s.i. increases the density of water by three parts per million. This increased density will absorb as much infra-red radiation as 0.08 part per million of heavy water (HDO), and if this were the only effect, the pressure could fluctuate by as much as 10 p.s.i. But pressure fluctuations, by changing the flow rate, affect the temperature control. It has been found that to maintain the required high degree of temperature control, the pressure fluctuations must be limited to 1 p.s.i.

In the use of an analyzer as referred to above, it is desirable to monitor several water streams which are sampled sequentially. Full response cannot be obtained from a new water sample until the previous sample has been purged from the system. The amount of time required for purging a previous sample from the system can be substantially reduced by providing two alternate systems which are used to deliver samples to the infra-red analyzer alternately. While the previous sample is being purged from one system, water from the other system can be supplied to the analyzer.

The present invention provides a system for delivering successive samples of water together with a reference water supply to an infra-red analyser for determining small changes in isotopic purity of water, which meets all of the above requirements and provides for a constant pressure to be exerted on both the reference water and the samples being compared, provides means for maintaining the temperature of the samples constant within very close limits, and at the same time provides for the alternate supply of samples to the flow modulator and analyser thereby reducing the delay necessary for purging the previous samples from the system.

Figure 2:
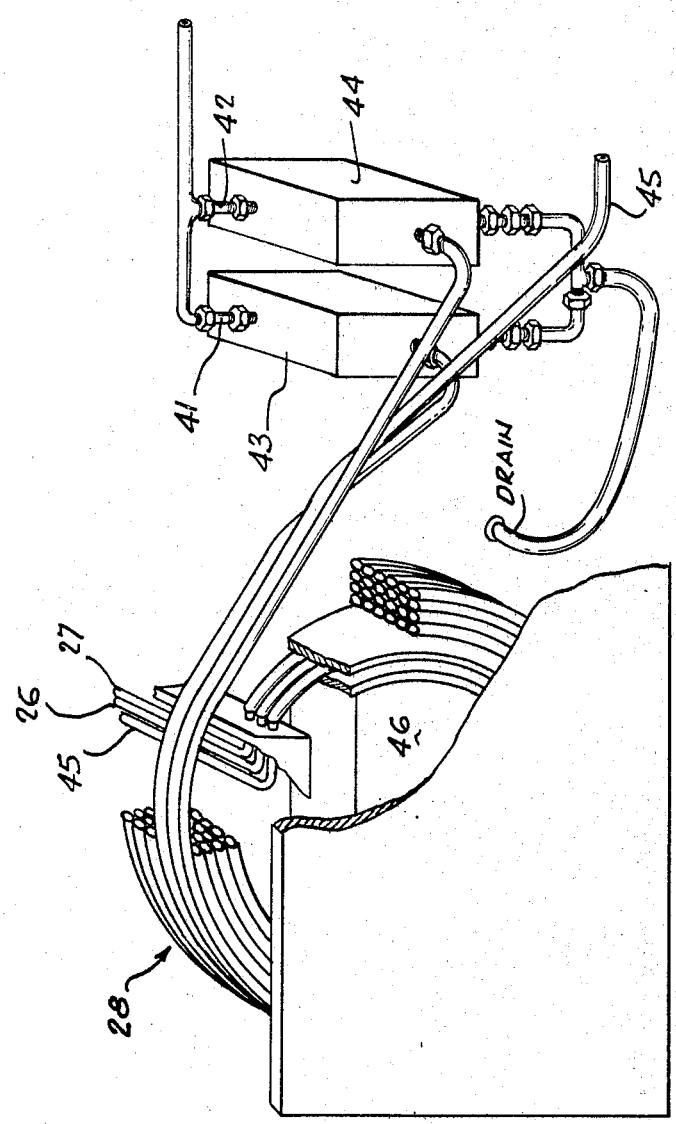

In drawings which illustrate an embodiment of the invention,

FIG. 1 is a schematic diagram of the sample delivery system of the present invention, and FIG. 2 is a perspective partly in section of one form of equilibration tubing structure constructed in accordance with the present invention.

FIG. 1 shows a schematic flow diagram in which a number of samples, No. 1, No. 2, etc. are accumulated in 400 ml. containers. Each sample stream flow rate is adjusted to fill its container in the time available between analyses of that sample. About one minute before the $n$th sample is to be analysed, the solenoid valves for the sample are energized automatically. Flow straight through the valves then pressurizes the container from a compressed air supply and allows the water to be driven to the analyser, expelling water from the equilibration tubing through a valve to the drain. When it is time to start the analysis, this valve is energized, and the sample flows to the modulator and infra-red cell. Two minutes later, when the analysis of the $n$th sample is finished, the solenoid valves at its accumulator are de-energized. When its air pressure drops the now nearly empty accumulator starts refilling to be ready for the next analysis. The accumulators may be used in any sequence except that because of the purging operation odd and even numbered samples must always alternate.

In addition to the sample accumulators, two similar containers are needed for the reference streams. These are collected and propelled as the sample streams are, except that no purging is needed. Because the air supply is used to drive both references and all sample streams, the equal pressure requirement at the modulator is easily achieved.

When the accumulators are being filled, they vent to the atmosphere unless the sample is known to contain an excessive amount of dissolved gas. In this case the vent pressure may be reduced, as by an aspirator, to make the water effervesce as it is accumulating. Only a negligible amount of air will be redissolved during the time the propellant air pressure is applied.

As shown in FIG. 1, a sample delivery system consists of a plurality of reservoirs 10, 11, 12, 13, 14 and 15, which are intended to receive reference water and samples for comparing the infra-red absorption spectra of the samples with the reference. As shown in the schematic diagram of FIG. 1, reservoirs 10 and 11 are designated R1 and R2 for the use of reference water, and are connected to a reference water supply 16 through the three-way valve 17. The valve 17 has two operating positions, the first of which connects the supply 16 to the reservoir 10, and the second of which connects the supply 16 to the reservoir 11. Similarly reservoirs 12, 13, 14 and 15 may be filled from sample sources 18, 19, 20 or 21 via valves 22, 23, 24 or 25. Each of the valves 22, 23, 24 or 25 has two operating positions, a first position in which the sample source is connected to the reservoir, and a second position in which the reservoir is connected to the equilibration tubing. The reservoirs 12 and 14 are connected via valves 22 and 24 to conduit 26, and the reservoirs 13 and 15 are connected via valves 23 and 25 to conduit 27 and samples may be applied from the conduits 26 and 27 through the equilibration tubing 28 to the drain or to the flow modulator and infra-red cell leak detector 29 depending on the state of valves 43 and 44. When samples have been stored in the reservoirs 12, 13, 14 and 15, and reference water in the reservoirs 10 and 11, the samples and reference water are driven through the equilibration tubing 28 by compressed air from a source 30, the pressure of which is regulated by a pressure regulator 31, and displayed on a pressure gauge 32. The air supplied to each of the reservoirs via conduit 33 is connected to valves 34, 35, 36, 37, 38 and 39. When water from the reservoir 10 is to be transferred to the equilibration tubing 28, the valve 34 is operated to disconnect the drain from reservoir 10 and to connect the conduit 33 to the reservoir 10, and simultaneously the valve 40 connects the reservoir 10 to the equilibration tubing 28. After passing through the equilibration tubing the reference water is supplied to the flow modulator and leak detector 29. When the reservoir 10 is nearly empty, reference water can be supplied from the reservoir 11 via the valve 40 to the equilibration tubing 28. This is done by operating valve 40 and the valve 35 so that air pressure from the conduit 33 will drive the water from the reservoir 11. In order that the reservoir 10 can be refilled while water is being drawn from the reservoir 11, the valve 17 connects the reservoir 10 to the source of reference water 16, and when the reservoir 11 requires replenishing the valve 17 is operated to connect reservoir 11 to the source 16. It will be appreciated that when reservoir 10, or 11 is being filled, the associated valves 34 or 35 connect the upper end of these reservoirs to the drain, or if the reference water contains an excessive amount of dissolved gas, then the venting pressure may be reduced as by an aspirator connected to the drain causing the water to effervesce as it is entering the reservoirs 10 and 11.

Similarly with the reservoirs 12, 13, 14 and 15, the valves 22, 23, 24 and 25 are operated in order to connect these reservoirs to the sources of water samples, and at the same time the valves 36, 37, 38 and 39 connect the upper portions of the reservoirs 12, 13, 14 and 15 to the drain to permit the air in the reservoir to be vented to the drain.

It will be noted that two conduits 26 and 27 connect the water samples to the equilibration tubing 28 and there are two conduits 41 and 42 extending from the equilibration tubing 28 to the flow modulator 29. A pair of valves 43 and 44 is inserted in the conduits 41 and 42 which have one connection to the drain. The reference water from the equilibration tubing 28 is fed via conduit 45 to the flow modulator and leak detector 29.

An important advantage of this reservoir system is that the samples can be collected slowly over a long period of time between analyses, or they can be collected rapidly so that the reservoir over flows to the drain until it is time to start the analysis. When used in the former way the system accommodates small streams of a scarce sample; in the latter way it ensures that the water analysed represents the most recent sample.

The electrical circuits necessary to obtain the properly timed operation of the solenoid valves of FIG. 1 may readily be designed by persons skilled in the art of such circuit design, and the design of such switching circuits is not intended to form a part of the present invention.

The unfortunate sensitivity of the detector disclosed in U.S. Pat. No. 3,411,012 to the presence of air bubbles in the water samples has led to the reservoir arrangement shown as $S_5$ in FIG. 1. Here the water supply 50, expected to contain dissolved or entrained air, is fed to the reservoir $S_5$ through a valve 51 to a point appreciably higher in the reservoir than the separate exit pipe to valve 52. The exit from valve 53 is connected to a suction line (an aspirator or water ejection pump) and air entering with the water through valve 51 is rapidly removed. When the degassed sample in $S_5$ is to be analysed, valve 53 connects the compressed air to the reservoir, valve 51 is closed and valve 52 opened. By separating the filling from the emptying tubes, air bubbles trapped between valve 51 and reservoir $S_5$ at the end of the filling cycle are prevented from reaching valve 52.

An additional advantage of this use of separate filling and emptying valves, 51 and 52, is that when $S_5$ has been filled both may be closed until the sample is needed for analysis. This would be a valuable feature if conservation of water samples was more important than having the most recent water sample available for analysis. The particular analyser for which this sample input system was invented required two simultaneous streams of water, each flowing at 2 ml./sec. The flow modulator 29 causes these streams to pulsate 9 times per second.

The absorption spectra of the molecules is temperature sensitive. The cause of this is not well understood (probably involving the tendency for water to form complexes of the form $H_4O_2$, $H_6O_3$, etc.), but the effect is that an OH absorption band near 4.7 microns weakens and shifts to a longer wavelength as the temperature rises. The OD absorption in HDO at 4 microns also becomes weaker, though with no significant shift. For water near the natural isotopic concentration, a 1° C. rise in temperature gives approximately the same change in the spectrum at 4 microns as a decrease of 110 parts per million nominal $D_2O$ concentration. The effect is in the same direction but about forty times greater than the effect to be expected from the change in water density near 30° C. Unfortunately the temperature has very little influence upon the spectrum at the comparison wagelength, and it appears impractical to reduce the interference by applying a correction.

In the apparatus of the invention the temperatures of the two streams are maintained within 0.01° C. of each other by passing them through equilibration tubes which are soldered side by side and immersed in a thermostatted bath. Since in a length of ⅛″ tubing approximately 50 cm. long the temperature difference between the water and the tubing changes to $1/e$ of its initial difference, a length of 4 meters will bring the two streams to within 0.01° C. even if they initially differ by 30° C. This 50 cm. relaxation length is roughly constant, independent of flow rate between 1 cm.³/sec. and 8 cm.³/sec.

The actual operating temperature is not critical, but should be sufficiently constant that temperature transients do not introduce differences of as much as 0.01° C. between the reference and sample streams. It is essential that the temperature be high enough to prevent water condensation on the cell windows; on the other hand the performance of the infra-red detector is degraded as the temperature is raised. A suitable compromise is 30° C.

In many applications the analyser will be used to monitor several water stream samples sequentially. No response can be obtained from a new water sample until the 4 meters of equilibrating tubing and the flow modulator have been purged of the previous sample. To reduce this delay the tubing and the modulator should be made as small as possible.

The delay is almost eliminated in accordance with the invention by using two tubes for water samples. During the analysis of one sample, the next to be analysed can be run through the added tube to be ready when needed. About 150 cm.$^3$ water will be used. A pair of valves 43 and 44 is also required between the equilibration tubes and the modulator, and the control circuits are slightly more elaborate, but the time saved permits the number of analyses per hour to be increased by 50%.

A pressure difference of 30 to 45 pounds per square inch is required to drive the pulsating flow through the cell, and it is essential that the pressure never drop low enough to allow gas in solution in the water to form bubbles in the cell.

The modulator and detector 29 operate at 9 cycles per second, and tests have shown that to avoid undesirable interference, fluctuations in the pressure of the water in lines 41, 42 and 45 should have their 9 c./s. component not greater than 1 p.s.i. The sensitivity to pressure may be due to changes in cell dimensions, or to the compressibility of water, since an increase of 1 p.s.i. increases the density of water by three parts per million. The extra 3 p.p.m. of $H_2O$ will absorb as much infra-red radiation as 0.08 p.p.m. HDO. As in the cases of the temperature effect, the observed pressure effect is about 40 times greater than can be predicted from density changes.

Since the passages in the IR cell are necessarily small, it is desirable that filters be placed in the water lines. Sintered stainless steel with a pore size 5 to 8 microns has been found satisfactory, but if the water contains materials which may coagulate, as for example on heating or cooling, special precautions may be necessary.

FIG. 2 shows the contents of a thermostatted bath of water, and illustrates in perspective one form of equilibration tubing structure for use with the present invention. The equilibration tubing shown generally at 28 consists of the three individual tubes 26, 27 and 45, which may be seen entering the thermostatted bath from the rear, and passing around the perimeter of the thermostat chamber 46. The three individual tubes forming the equilibration tubing are then wrapped in concentric layers about the outside of chamber 46 and are fed from there to the valves 43 and 44, and the tubing 45 directly to the flow modulator and infra-red cell leak detector of FIG. 1. Water enters the thermostatted water bath through the thermostat chamber 46 and leaves by a drain (not shown).

The embodiments of the invention in which an exclusive property or privilege is claimed are defined as follows:

1. A sample delivery system for providing a plurality of samples of water together with reference water to a flow modulator and isotopic purity measuring device, said system comprising a source of reference water, at least one pair of sources of samples to be compared to said reference water, means for storing and delivering said reference water and said samples to said flow modulator and isotopic purity measuring device including equilibration tubing having three tubes in a controlled temperature bath, a tube for reference water, and a tube for samples from each of said pair of sources of water samples for equalizing the temperatures of said reference water and said water samples from said pair of sources, a single source of pneumatic pressure for driving said samples and said reference water through said system, said source of pneumatic pressure being connected to drive said reference water together with water from one or other of said pair of sources whereby said reference water and alternate samples from said pair of sources are delivered to said flow modulator and isotopic purity measuring device.

2. A system according to claim 1 wherein said sources of samples constitute at least one pair of sample reservoirs, and means are provided for filling said pair of reservoirs, and for supplying sample water to said flow modulator and isotopic purity measuring device alternately from one and the other of said pair of reservoirs.

3. A system as claimed in claim 2 wherein the upper end of each sample reservoir is connected to a drain during filling, and to a source of pneumatic pressure during delivery of sample water from a reservoir.

4. A system according to claim 3, wherein said drain is maintained at a reduced pressure to promote the removal of gas from said sample water during filling of a sample water reservoir.

5. A system according to claim 2 and including at least two reservoirs for reference water and means for connecting said two reference water reservoirs to said system alternately.

6. A system according to claim 5 and including means for supplying reference water to said two reservoirs alternately, said reservoirs being connected at their upper ends to a drain during filling, and to said source of pneumatic pressure during delivery of reference water from a reservoir.

7. A system according to claim 6 wherein said drain is maintained at a reduced pressure to promote the removal of gas from said reference water during filling of said reservoir.

References Cited

UNITED STATES PATENTS

| | | | |
|---|---|---|---|
| 3,083,577 | 4/1963 | Nelson et al. | 73—422 |
| 3,024,642 | 3/1962 | Jones | 73—54 |
| 3,369,405 | 2/1968 | Galegar | 73—421 |

OTHER REFERENCES 720,161  12/1954  Great Britain.

S. CLEMENT SWISHER, Primary Examiner